US011528666B2

(12) United States Patent
Lekutai

(10) Patent No.: US 11,528,666 B2
(45) Date of Patent: Dec. 13, 2022

(54) UNMANNED AERIAL VEHICLE TRANSMISSION POWER ADJUSTMENT

(71) Applicant: T-Mobile USA, Inc., Bellevue, WA (US)

(72) Inventor: Gaviphat Lekutai, Kirkland, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 215 days.

(21) Appl. No.: 17/011,970

(22) Filed: Sep. 3, 2020

(65) Prior Publication Data

US 2022/0070792 A1    Mar. 3, 2022

(51) Int. Cl.
*H04W 52/28* (2009.01)
*B64C 39/02* (2006.01)

(52) U.S. Cl.
CPC ......... *H04W 52/282* (2013.01); *B64C 39/024* (2013.01); *B64C 2201/14* (2013.01)

(58) Field of Classification Search
CPC .. B64C 2201/14; B64C 39/024; H04W 52/14; H04W 52/246; H04W 52/282; H04W 52/285; H04W 52/343
USPC .............................. 455/13.4, 522, 575.9, 297
See application file for complete search history.

(56) References Cited

U.S. PATENT DOCUMENTS

| 9,537,561 | B1* | 1/2017 | Kotecha | H04W 8/00 |
| 9,918,235 | B2 | 3/2018 | Brennan et al. | |
| 2015/0304885 | A1 | 10/2015 | Jalali | |
| 2016/0363929 | A1* | 12/2016 | Clark | B64C 39/024 |
| 2016/0371985 | A1* | 12/2016 | Kotecha | G01C 21/005 |
| 2017/0320569 | A1* | 11/2017 | Gordon | G05D 1/106 |
| 2018/0247544 | A1* | 8/2018 | Mustafic | H04W 48/04 |
| 2018/0288630 | A1* | 10/2018 | Guirguis | H04W 52/146 |
| 2019/0306675 | A1* | 10/2019 | Xue | B64C 39/024 |
| 2019/0342842 | A1 | 11/2019 | Stephens et al. | |
| 2020/0005653 | A1* | 1/2020 | Kim | H04W 52/367 |
| 2020/0090255 | A1* | 3/2020 | Rodriguez Bravo | G01W 1/10 |
| 2020/0245217 | A1* | 7/2020 | Zhang | H04W 64/003 |
| 2020/0260242 | A1* | 8/2020 | Hong | G08G 5/0069 |
| 2020/0266903 | A1* | 8/2020 | De Rosa | H04B 7/18506 |
| 2021/0208602 | A1* | 7/2021 | Yi | G05D 1/0011 |

\* cited by examiner

*Primary Examiner* — Tan H Trinh
(74) *Attorney, Agent, or Firm* — Han Santos, PLLC

(57) ABSTRACT

Methods, systems, and apparatus, including computer programs encoded on a computer storage medium, for adjusting the transmission power of an unmanned aerial vehicle are disclosed. In one aspect, a method includes the actions of determining, by an unmanned aerial vehicle that includes a radio transceiver, an altitude of the unmanned aerial vehicle and a distance between the unmanned aerial vehicle and a base station. The actions further include, based on the altitude of the unmanned aerial vehicle and the distance between the unmanned aerial vehicle and the base station, determining, by an unmanned aerial vehicle, a transmission power level for the radio transceiver. The actions further include communicating, by the unmanned aerial vehicle, with the base station using the radio transceiver operating at the transmission power level.

20 Claims, 7 Drawing Sheets

600

610 Determine, by an unmanned aerial vehicle that includes a radio transceiver, an altitude of the unmanned aerial vehicle and a distance between the unmanned aerial vehicle and a base station

620 Based on the altitude of the unmanned aerial vehicle and the distance between the unmanned aerial vehicle and the base station, determine, by the unmanned aerial vehicle, a transmission power level for the radio transceiver

630 Communicate, by the unmanned aerial vehicle, with the base station using the radio transceiver operating at the transmission power level

FIG. 6

UNMANNED AERIAL VEHICLE TRANSMISSION POWER ADJUSTMENT

BACKGROUND

An unmanned aerial vehicle (UAV) may be an aircraft that does not have a human pilot on board. A UAV can be controlled remotely or using an on-board navigation system. Some UAVs may include a cellular radio that is capable of communicating with a cellular network. The UAV may receive navigation instructions through the cellular radio and output data collected from various sensors included in the UAV.

BRIEF DESCRIPTION OF THE DRAWINGS

The detailed description is described with reference to the accompanying figures, in which the left-most digit(s) of a reference number identifies the figure in which the reference number first appears. The use of the same reference numbers in different figures indicates similar or identical items.

FIGS. 6 and 7 are flowcharts of example processes for adjusting the transmission power of a UAV.

DETAILED DESCRIPTION

UAVs are becoming increasingly popular and include more and more features. One of these features can include a cellular transceiver that allows the UAV to communicate with a cellular network. While a mobile phone typically stays on the ground when it is communicating with the cellular network, a UAV flies around an aerial space, navigates a marine environment, moves around underground, and/or moves around any other area while its cellular transceiver is communicating with the same cellular network. As the UAV gains altitude, it is able to communicate with more base stations than a mobile phone on the ground below the UAV. This can cause interference in the area around the UAV which can degrade the quality of a connection between a mobile phone on the ground and the base station. This can also cause the UAV to unnecessarily switch between base stations because a higher number of base stations are visible to the UAV when it is flying.

To reduce the likelihood of interference, the cellular transceiver of the UAV can be configured to adjust the power level that the cellular transceiver uses to communicate with the base station as the UAV changes altitude. As the UAV increases altitude, the cellular transceiver can decrease its transmission power. By decreasing the transmission power, the number of base stations with which the UAV is able to communicate decreases to a number that is typical for a mobile phone on the ground. This reduction prevents the UAV from unnecessarily switching between base stations.

When there are multiple UAVs in the same vicinity, reducing the transmission power prevents the UAVs from interfering with each other, with mobile phones on the ground, and/or other nearby devices. Without the benefit of being able to adjust the transmission power based on the altitude, several UAVs in the same vicinity can cause mobile phones on the ground to receive a degraded signal from the base station resulting in a lost connection. By reducing the transmission power of the UAVs, the base station is able to maintain connectivity with the mobile phone.

Figure 1:
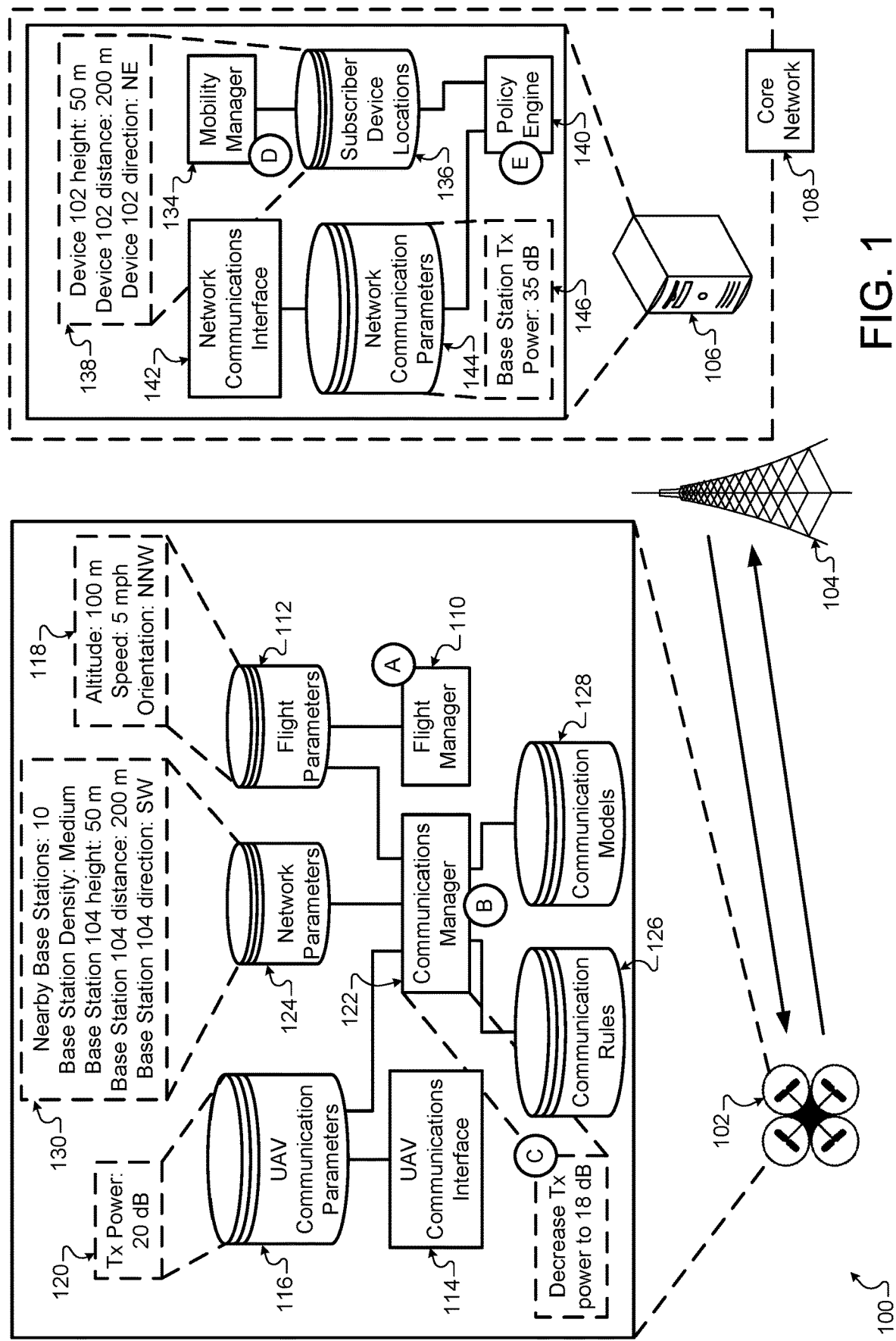
FIG. 1 illustrates an example system adjusting the transmission power of a UAV.

FIG. 1 illustrates an example system 100 adjusting the transmission power of a UAV 102. Briefly, and as described in more detail below, the UAV 102 is navigating through the air and communicating with the base station 104 of a wireless carrier network. As the flight parameters 118 of the UAV 102 change, the UAV 102 changes the transmission power with which the UAV communications interface 114 communicates with the wireless carrier network. By changing the transmission power, the UAV 102 reduces interference with the wireless carrier network and other devices while navigating the air.

In more detail and in stage A, the UAV 102 is navigating through the air. The UAV 102 may be navigating based on a predetermined flight pattern, through remote control, or through a similar mechanism. The UAV 102 may include a flight manager 110 that is configured to determine various flight parameters 118 as the UAV 102 navigates through the air. The flight manager 110 may be software or executable instructions embodied in computer-readable media included in or accessible by the UAV 102. The flight parameters 118 may include altitude, speed, orientation, and any other similar measurement. The flight parameters 118 may include the roll, yaw, and pitch of the UAV 102 relative to a reference location. In some implementations, the flight parameters 118 may also include parameters related to the status of the flight equipment of the UAV 102. For example, the flight parameters 118 may include a speed of each motor, a position of any rudders, a current battery level, and any other similar parameter. The flight manager 110 determines the flight parameters 118 and stores the flight parameters in the flight parameters storage 112.

The flight manager 110 may determine the flight parameters 118 at various times while navigating the air. In some implementations, the flight manager 110 may continuously sense the flight parameters 118. In some implementations, the flight manager 110 may compute the flight parameters 118 at periodic intervals. For example, the flight manager 110 may compute the flight parameters 118 every fifteen seconds, every minute, or another similar time interval. In some implementations, the flight manager 110 may compute the flight parameters 118 in response to a request from another computing device. For example, the flight manager 110 may compute the flight parameters 118 in response to a request from the network server 106. In some implementations, the flight manager 110 may compute the flight parameters 118 in response to a change in the network parameters 124 of the wireless carrier network. For example, if the flight manager 110 receives data indicating that base station density has changed from low to medium, then the flight manager 110 may compute the flight parameters 118. The flight manager 110 may store a timestamp with the flight parameters 118 in the flight parameters storage 112. The timestamp may indicate the time at which the UAV 102 measured the corresponding flight parameters in the flight parameters 118.

In the example shown in FIG. 1, the flight manager 110 determines that the altitude of the UAV 102 is one hundred meters, the speed of the UAV 102 is five miles per hour, and the orientation of the UAV 102 is north-northwest. The flight manager 110 may store these flight parameters 118 in the flight parameters storage 112 along with a timestamp of the time when the flight manager 110 determines these flight parameters 118.

The UAV 102 may include a UAV communications interface 114 that is configured to communicate with the base station 104, other UAVs, and other base stations of the wireless carrier network. The UAV communications interface 114 may include a cellular interface or other transceiver that is configured to communicate with the wireless carrier network. The UAV communications interface 114 may include one or more antennas. The antennas may be located at different positions on the UAV 102. For example, the UAV 102 may include a front antenna and a back antenna.

UAV communications interface 114 may be configured to transmit data to the base station 104 at various power levels. For example, the UAV communications interface 114 may be configured to transmit data to the base station 104 at a power level between eight decibels and twenty-three decibels. The UAV communications parameters storage 116 may store data indicating the transmission power level 120 for the UAV communications interface 114. For example, the transmission power level 120 may be twenty decibels. The UAV communications interface 114 may transmit data to the base station 104 and determine the appropriate power level based on the transmission power level 120 stored in the UAV communications parameters storage 116. As the transmission power level 120 changes, the data stored in the UAV communications parameters storage 116 may update.

The UAV 102 may include a communications manager 122 that is configured to determine an appropriate transmission power level based on the data stored in the flight parameters storage 112, the data stored in the network parameters storage 124, and/or the data stored in the UAV communications parameters storage 116. The communications manager 122 may be software or executable instructions embodied in computer-readable media included in or accessible by the UAV 102. The communications manager 122 may be configured to use the communication rules 126 and/or the communication models 128 to determine how to adjust the transmission power level 120 based on the data stored in the flight parameters storage 112, the data stored in the network parameters storage 124, and/or the data stored in the UAV communications parameters storage 116.

In stage B, the communications manager 122 may determine the network parameters 130 for the wireless carrier network that includes the base station 104. The network parameters 130 may include parameters related to the location, density, and size of the base stations that are in the vicinity of the UAV 102. The communications manager 122 may store the network parameters 130 in the network parameters storage 124 of the UAV 102.

The network parameters 130 stored in the network parameters storage 124 may include some network parameters that the network server 106 provides and others that the communications manager 122 determines. For some network parameters, the network server 106 may provide them and/or the communications manager 122 may determine them. The network server 106 may provide network parameters that include base station density, base station height, base station distance, base station direction, and/or any other similar network parameters. The communication manager 122 may determine the number of nearby base stations with which the UAV communications interface 114 is able to communicate, base station density, base station height, base station distance, base station direction, and/or any other similar network parameters.

In some implementations, the UAV 102 receives one or more of the network parameters 124 from the network server 106 through the base station 104. The network server 106 may periodically transmit one or more of the network parameters 130, for example, every minute or every two minutes. The network server 106 may determine the location of the UAV 102 according to the periodic interval. Based on the location of the UAV 102, the network server 106 transmits one or more of the network parameters 124 to the UAV 102. The communications manager 122 stores the one or more of the network parameters 130 in the network parameters storage 124.

In some implementations, the network server 106 transmits one or more of the network parameters 130 in response to the network server 106 determining that the UAV 102 has moved at least a threshold distance. For example, if the network server 106 determines that the UAV 102 has moved at least fifty meters since the last time the network server 106 provided one or more of the network parameters 130, then the network server 106 may transmit updated network parameters 130 to the UAV 102.

In some implementations, the UAV 102 requests one or more of the network parameters 130 from the network server 106. The UAV 102 may request one or more of the network parameters 130 at periodic intervals, such as every minute or two minutes. In some implementations, the UAV 102 may request one or more of the network parameters 130 based on a determination. The UAV 102 may request updated network parameters 130 in response to detecting a change in one or more of the flight parameters 118 and/or a change in the number of base stations that are available for the UAV communications interface 114. For example, if the altitude of the UAV 102 changes by at least ten meters, then the UAV 102 may request updated network parameters 130. As another example, if the number of base stations with which the UAV communications interface 114 is able to communicate changes from ten to eleven, then the UAV 102 may request updated network parameters 130.

In some implementations, the communications manager 122 determines one or more of the network parameters 130 based on analyzing the signals transmitted between the UAV communications interface 114 and the base station 104 and the flight parameters 118. The communications manager 122 may determine the number of nearby base stations by analyzing the signals received by the UAV communications interface 114 and determining which signals originated from unique base stations and which are strong enough. The communications manager 122 may also analyze the signals and the flight parameters 118 to determine an approximate density of the base stations, the height, the distance from the UAV 102, and/or the direction. The base station density may be related to the number of base stations per ground area. For example, a density below one base station per square mile may be a low density, a density above ten base stations per square mile may be high density, and in between may be medium density.

In stage C, the communications manager 122 determines whether to adjust the transmission power level 120 based on the network parameters 130, the flight parameters 118, the UAV communication parameters 116, the communication rules 126, and/or the communication models 128. The communications manager 122 may use the communication rules 126, and/or the communication models 128 to adjust the transmission power level 120 to ensure that the UAV communications interface 114 of the UAV 102 does not cause interference with nearby devices, such as phones on the ground, that are attempting to communicate using the wireless carrier network. The communication rules 126 may specify how to compare the network parameters 130, the UAV communication parameters 116, and/or the flight parameters 118 to determine whether to adjust the transmission power level 120. The communication models 128 may be configured to receive one or more of the network parameters 130, the UAV communication parameters 116, and/or the flight parameters 118 to determine whether to adjust the transmission power level 120. In some instances, the communications manager 122 may use the communication rules 126 or the communication models 128 or both to determine whether to adjust the transmission power level 120.

The communication rules 126 may include ranges and threshold for one or more of the network parameters 130, the UAV communication parameters 116, and/or the flight parameters 118 that corresponds to an adjustment to the transmission power level 120. For example, a communication rule 126 may specify that if the altitude of the UAV 102 is between fifty and seventy meters, then the transmission power level 120 should be twenty decibel-milliwatts. Another communication rule 126 may specify that if the altitude of the UAV 102 is above one hundred meters, then the transmission power level 120 should be ten decibel-milliwatts. Another communication rule 126 may specify that if the altitude of the UAV 102 is between thirty and fifty meters and the base station density is medium, then the transmission power level 120 should be twelve decibel-milliwatts.

Other communication rules may specify a transmission power level 120 for the speed of the UAV 102, the orientation of the UAV 102, the orientation of the base station 104, the ground distance between the UAV 102 and the base station 104, the direct distance between the UAV 102 and the base station 104, the height of the base station 104, the density of the nearby base stations, the number of nearby base stations with which the UAV 102 is able to communicate, a distance between the UAV 102 and a nearby UAV, a density of UAVs in the air, and/or any other similar measurement.

In some implementations, a communication rule 126 may specify an adjustment to a flight parameter 118 while maintaining the transmission power level 120. For example, the communication rule 126 may indicate to adjust the altitude of the UAV 102 until the UAV 102 is able to communicate with five nearby base stations. This rule may include a minimum altitude before the communications manager 122 begins adjusting the transmission power level 120.

In some implementations, a communication rule 126 may specify a target network parameter to meet by adjusting the transmission power level 120. For example, a communication rule 126 may specify that a target number of nearby base stations that the UAV 102 receives signals from that are above a signal threshold is five base stations. If the number of nearby base stations is ten, then the rule specifies to reduce the transmission power level 120 until the UAV 102 is able to communicate with five base stations. This may be accomplished by reducing the transmission power level 120 from eighteen decibel-milliwatts to fifteen decibel-milliwatts.

Some of the communication rules 126 may be ranked such that the communications manager 122 implements the lower ranked rules first and implements rules that increase in ranking. By ranking the rules, the communications manager 122 may implement conflicting rules, but the rule that is ranked higher may affect the transmission power level 120 because the communications manager 122 implements it later.

The communication manager 122 may use the communication models 128 alone or in conjunction with the communication rules 126. The communication models 128 may include one or more models that are trained using training data and machine learning. The training data may include historical data collected from various UAVs communicating with various networks. Each sample of the training data may be collected from the UAVs at periodic intervals and/or when the UAVs change transmission power levels. Each sample may include a number of nearby base stations, the base station density, the height of the base station with which the UAV is communicating, the distance between the base station and the UAV, the direction of the base station, the altitude of the UAV, the speed of the UAV, the orientation of the UAV, the transmission power level of the UAV, the transmission power level of the base station, the number of nearby UAVs, an interference level cause by the UAV, a transmission power level of nearby user devices, and/or any other similar data.

The one or more models may be trained using machine learning and the samples of the training data. Each model may be trained using samples that include the same parameters. For example, a model may be trained using the samples that include the base station density, the direction of the base station, the altitude of the UAV, the speed of the UAV, the transmission power level of the UAV, the transmission power level of the base station, an interference level cause by the UAV, and a transmission power level of nearby user devices. The resulting model may be configured to receive data indicating the base station density, the direction of the base station, the altitude of the UAV, the speed of the UAV, the transmission power level of the UAV, the transmission power level of the base station, and a transmission power level of nearby user devices and output data indicating how to adjust the transmission power level of the UAV.

The communications manager 122 may be configured to select the appropriate model based on the data included in the network parameters 130, the UAV communication parameters 116, and/or the flight parameters 118. If the network parameters 130 include the base station 104 height, the distance between the UAV 102 and the base station 104, and the altitude of the UAV 102, then the communications manager 122 selects a model that is configured to receive that input. Each of the models may be configured to output data indicating how to adjust the transmission power level of the UAV 102. In some implementations, some of the models may be configured to adjust other parameters of the UAV 102 to reduce the likelihood of interference. For example, some models may be configured to adjust the altitude, speed, orientation, and/or any other similar parameter of the UAV 102.

In the example shown in FIG. 1, the communication manager 122 accesses the UAV communication parameters storage 116 indicating that the transmission power level 120 of the UAV 102 is twenty decibels. The network parameters 130 indicate that there are ten nearby base stations. A nearby base station may be a base station with which the UAV 102 is able to communicate. The network parameters 130 may also indicate that the base station density in the vicinity of the UAV 102 is medium. The base station 104 height is fifty meters. The distance between the UAV 102 and the base station 104 is two hundred meters. The direction of base station 104 from the UAV 102 is southwest. The flight parameters 118 indicate that the altitude of the UAV 102 is one hundred meters. The speed of the UAV 102 is five miles per hour. The orientation of the UAV 102 is north-northwest.

The communication manager 122 accesses the communication rules 126 and/or the communication models 128. The communication manager 122 may identify a communication rule that specifies how to adjust the transmission power level 120 based on the altitude of the UAV 102. The communication models 128 may not include a model that is configured to receive each of the parameters of the UAV communication parameters 116, the network parameters 130, and the flight parameters 118. Based on the communication rule, the communication manager 122 determines that the transmission power level 120 should decrease to eighteen decibels. The communication manager 122 updates the UAV communication parameters 116, and the UAV communications interface 114 begins communicating with the base station 104 eighteen decibels.

In some implementations, the network server 106 may instruct the UAV 102 how to adjust the transmission power level 120. This instruction may be in addition to the determination made by the communications manager 122 or may be in place of that determination. In some implementations, the communications manager 122 may average the transmission power level 120 that is determined using the communication rules 126 and/or the communication models 128 with the transmission power level 120 included in an instruction from the network server 106. The communications manager 122 may instruct the UAV communications interface 114 to communicate using the average transmission power level.

The network server 106 may be included in a wireless carrier network that provides voice and data communication services to multiple subscriber devices, such as the UAV 102 and other devices such as mobile phones and other UAVs. The wireless carrier network may provide telecommunication and data communication in accordance with one or more technical standards, such as Enhanced Data Rates for GSM Evolution (EDGE), Wideband Code Division Multiple Access (W-CDMA), High Speed Packed Access (HSPA), Long Term Evolution (LTE), 5th Generation (5G) wireless systems, CDMA-2000 (Code Division Multiple Access 2000), and/or other similar standards.

The wireless carrier network may include a radio access network and a core network 108. The radio access network may include multiple base stations, such as base station 104. The multiple base stations are responsible for handling voice and data traffic between multiple subscriber devices, such as the UAV 102 and other devices and the core network 108. Accordingly, each of the base stations may provide a corresponding network cell that delivers telecommunication and data communication coverage. The core network 108 may use the network cells to provide communication services to the multiple subscriber devices. For example, the core network 108 may connect the multiple subscriber devices to other telecommunication and data communication networks, such as the Internet and the public switched telephone network (PSTN). The base stations are responsible for handling voice and data traffic between user devices and the core network 108. In some implementations, the base stations may be in the form of eNodeB nodes. Each eNodeB node may include a base transceiver system (BTS) that communicates via an antenna system over an air-link with one or more user devices that are within range. The antenna system of an eNodeB node may include multiple antennas that are mounted on a radio tower to provide a coverage area that is referred to as a "cell." The BTS may send RF signals to user devices and receive radio signals from subscriber devices.

The network server 106 may include a mobility manager 134 that is configured to monitor the location of the various devices that are communicating with the wireless carrier network. The mobility manager 134 may store the location data of the various devices in the subscriber device locations storage 136. The mobility manager 134 may determine the location of the various devices based on the base station with which each device is connected. In some instances, the mobility manager 134 may use triangulation using base stations that are able to communicate with each device to determine the location of each device. In some instances, each device may transmit, to the network server 106, location data that may include GPS data that reflects a location of the device.

In some implementations, the location data may include altitude data that reflects an altitude of the device. The mobility manager 134 may receive altitude data as part of the GPS data. The mobility manager 134 may also determine the altitude of each device based on communications between the nearby base stations and each device. In some implementations, the location data may include direction data that reflects an orientation of the device. The orientation of the device may indicate a cardinal direction that a front of the device is pointed. The mobility manager 134 may receive the direction data from the device. The mobility manager 134 may also determine the orientation of the device based on communications between the nearby base stations and each device.

In some implementations, the mobility manager 134 may determine the distance between the device and the base station with which the device is communicating. The mobility manager 134 may determine the distance based on the location of the device and the location of the base station. In some instances, the mobility manager 134 may determine the distance based on timing of signals transmitted between the base station and the device.

The mobility manager 134 may receive, request, or determine the location data at periodic intervals. For example, the mobility manager may receive or determine the location data every minute, every three minutes, or every five minutes. The mobility manager 134 may receive, request, or determine the location data in response to a trigger event. The trigger event may be a change in location, speed, altitude, and/or orientation of the device by greater than a threshold amount. For example, the UAV 102 may output the location data to the network server 106 in response to the altitude changing at least five meters.

In the example shown in FIG. 1 and in stage D, the mobility manager 134 determines that the altitude of UAV 102 is fifty meters, the distance between the UAV 102 and the base station 104 is two hundred meters, and the UAV 102 is facing the northeast direction. The mobility manager 134 stores the location data 138 of UAV 102 in the subscriber device locations storage 136. In some implementations, the location data 138 may include a timestamp indicating the time at which the mobility manager 134 determined the location or the time at which the UAV 102 determined the location.

The network server 106 includes a network communications interface 142 that is configured to communicate with the UAV 102 and other client devices. The network communications interface 142 may include various antennas that the network server 106 uses to communicate with the UAV 102 and the other client devices. The network communications interface 142 may operate each of the various antennas at different power levels to communicate with the UAV 102 and the other devices. The network communication parameters storage 144 may store data that specify the parameters, such as the power level, used by the network communications interface 142 to communicate with the UAV 102 and the other devices. For example, the network communication parameters storage 144 may store the network communication parameters 144 indicating that the transmission power level of the network communications interface 142 is thirty-five decibel-milliwatts.

The network server 106 includes a policy engine 140 that is configured to determine an adjustment to the transmission power level 120 for the UAV communications interface 114. In some implementations, the policy engine 140 may not determine the adjustment to the transmission power level 120 for the UAV communications interface 114. Instead, the communications manager 122 may determine the adjustment to the transmission power level 120 without input from the policy engine 140.

The policy engine 140 may determine the adjustment to the transmission power level 120 based on the network parameters 130, the flight parameters 118, and/or the network communication parameters 144. The policy engine 140 may use similar rules and/or models as the communications manager 122 to determine the adjustment to the transmission power level 120. The rules may be configured to determine the adjustment to the transmission power level 120 based in part on the network communication parameters 144 in addition to the network parameters 130 and/or the flight parameters 118. The models are also configured to output the adjustment to the transmission power level 120 and receive the network communication parameters 144 in addition to the network parameters 130 and/or the flight parameters 118. The training data for the models may be similar to the training data for the communication models 128 with the addition of network communication parameters that include data related to the transmission power level of the base station 104. With the models being trained using the transmission power level of the base station 104, the models are configured to receive the network communication parameters 144.

The policy engine 140 may have access to data related to nearby subscriber devices that are connected to the wireless carrier network. This data may be similar to the network parameters 130 and/or the flight parameters 118 in the case of subscriber devices that are UAVs. In the case of a subscriber device that is a mobile phone or other similar device that typically remains on the ground, the network parameters 130 and/or the flight parameters 118 may not include information that is specific to UAVs. For example, the flight parameters 118 may not include the speed and/or the altitude of the mobile phone.

The policy engine 140 may use this data related to nearby subscriber devices to determine the adjustment to the transmission power level 120. The rules may be configured to determine the adjustment to the transmission power level 120 based in part on the network parameters of the nearby subscriber devices and/or the flight parameters of the nearby subscriber devices. The rules may also be configured to determine the adjustment to the transmission power level 120 based on the network communication parameter that is specific to each nearby subscriber device. Similarly, the policy engine 140 may use models trained using data samples that include the network parameters, flight parameters, and/or network communication parameters. The models may be configured to output an adjustment to the transmission power level 120 based on receiving network parameters, flight parameters, and/or network communication parameters of the UAV 102 and/or any nearby subscriber devices For example, and in stage E, the policy engine 140 accesses the network communication parameters 144 for the UAV 102 in addition to the network parameters 130, the location data 138, and/or the flight parameters 118. The policy engine 140 may analyze this data using various rules and/or models and determine an adjustment to the transmission power level 120 for the UAV 102. In some implementations, the rules and/or models may indicate an adjustment to the base station transmission power level 146.

Figure 2:
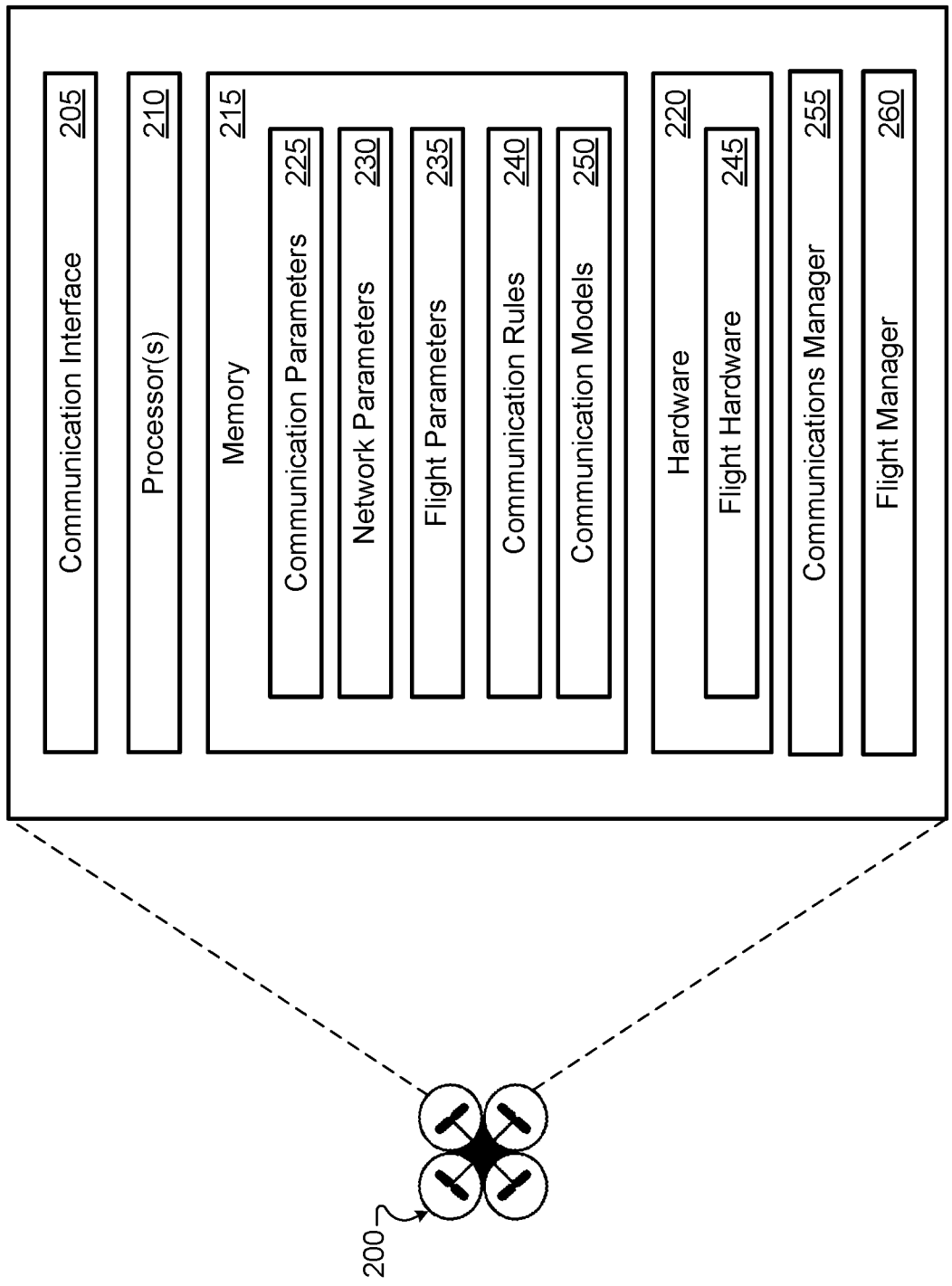
FIG. 2 illustrates an example UAV.

FIG. 2 illustrates an example UAV 200. The UAV 200 may include a computing device and be configured to navigate an aerial space and communicate with a wireless carrier network. For example, the UAV 200 may be similar to the UAV 102. Some of the components of the UAV 200 may be implemented in a single computing device or distributed over multiple computing devices. Some of the components may be in the form of virtual machines or software containers that are hosted in a cloud in communication with disaggregated storage devices.

The UAV 200 may include a communication interface 205, one or more processors 210, memory 215, and hardware 220. The communication interface 205 may include communication components that enable the UAV 200 to transmit data to and receive data from other networked devices. The communication interface 205 may include a cellular interface that is configured to communicate with base stations of a wireless carrier network. The communication interface 205 may include a local interface that is configured to communicate with other nearby devices such as a nearby UAV, a nearby mobile device, a docking station, and/or any other similar device. The local interface may be a wired connection and/or a wireless connection. The local interface may use short range radio, infrared, microwaves, Wi-Fi, and/or any other similar wireless communication technique. The local interface may use a wired connection such as contact pads.

The hardware 220 may include additional user interface, data communication, or data storage hardware. For example, the user interfaces may include a data output device (e.g., visual display, audio speakers), and one or more data input devices. The data input devices may include, but are not limited to, combinations of one or more of keypads, keyboards, mouse devices, touch screens that accept gestures, microphones, voice or speech recognition devices, and any other suitable devices. The hardware 220 may include flight hardware 245 that is configured to move the UAV 200 through the air. The flight hardware 245 may include takeoff and landing gear, motors, fans, flight sensors, and/or any other hardware used to navigate an air space.

The memory 215 may be implemented using computer-readable media, such as computer storage media. Computer-readable media includes, at least, two types of computer-readable media, namely computer storage media and communications media. Computer storage media includes volatile and non-volatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile disks (DVD), high-definition multimedia/data storage disks, or other optical storage, magnetic cassettes, magnetic tape, magnetic disk storage or other magnetic storage devices, or any other non-transmission medium that can be used to store information for access by a computing device. In contrast, communication media may embody computer-readable instructions, data structures, program modules, or other data in a modulated data signal, such as a carrier wave, or other transmission mechanism.

The one or more processors 210 may implement a flight manager 260. The flight manager 260 may be similar to the flight manager 110 of FIG. 1. The flight manager 260 may be configured to monitor the various flight parameters of the UAV 200 and store the flight parameters in the flight parameters storage 235. The flight parameters may include the altitude of the UAV 200, the speed of the UAV 200, the orientation of the UAV 200, and any other similar parameter. The flight manager 260 may determine the flight parameters at periodic intervals such as every minute or every two minutes. The flight manager 260 may determine the flight parameters in response to a trigger event. For example, if the UAV 200 receives a request from the wireless carrier network to determine the flight parameters, then the flight manager 260 may determine the current flight parameters of the UAV 200 and store the flight parameters in the flight parameters storage 235.

The one or more processors 210 may implement a communication manager 255. The communication manager 255 may be similar to the communication manager 122 of FIG. 1. The communication manager 255 may be configured to monitor the network parameters of the wireless carrier network. The communication manager 255 may store the network parameters in the network parameters storage 230. The network parameters may include any details related to the characteristics of the base station and wireless carrier network with which the UAV 200 is communicating. For example, the network parameters may include a number of base stations with which the UAV 200 is able to communicate, a density of the nearby base stations, a height of the base station with which the UAV 200 is communicating, a distance between the UAV 200 and the base station with which the UAV 200 is communicating, a direction from the UAV 200 to the base station, and/or any other similar parameters. The communication manager 255 may determine the network parameters at periodic intervals, such as every minute or every two minutes. In some instances, the communication manager 255 may determine the network parameters in response to a trigger event. For example, if the altitude of the UAV 200 changes by at least a threshold amount, then the communication manager 255 may determine the network parameters. As another example, the communication manager 255 may determine the network parameters in response to a request from the wireless carrier network.

The communication manager 255 may use a combination of the communication rules 240 and the communication models 250 to determine whether to adjust the communication parameters 225. The communication interface 205 may access the communication parameters 225 to determine the parameters for communicating with the wireless carrier network. For example, the communication parameters 225 may indicate a power level with which the communication interface 205 should communicate with the wireless carrier network. The power level may be twenty dB, fifteen dB, or another power level.

The communication rules 240 may specify how to adjust the communication parameters 225 based on the flight parameters 235 and the network parameters 230. The communication rules 240 may be predetermined and configured to ensure that the UAV 200 is able to communicate with the wireless carrier network while also ensuring that nearby subscriber devices are also able to communicate with the wireless carrier network. Each communication rule 240 may specify one or more ranges and/or thresholds for the flight parameters 235 and the network parameters 230 that correspond to specific network parameters. The communication rules 240 may be ranked such that the communication manager 255 applies the lower ranked rules before the higher ranked rules. The communication manager 255 may select the communication rules 240 to apply to the flight parameters 235 and the network parameters 230 based on the data that is included in the flight parameters 235 and the network parameters 230. For example, if the flight parameters 235 include altitude data but not speed data, then the communication manager 255 may select a communication rule that is configured to receive altitude data and not speed data. The communication rules may specify an adjustment to the communication parameters 225 and/or a target for the communication parameters 225. For example, the communication rule may specify a power level for the communication interface 205 to use when communicating with the wireless carrier network.

The communication models 250 may be configured to receive the flight parameters 235 and the network parameters 230 and output an adjustment and/or a target for the communication parameters 225. Each of the communication models 250 may be configured to receive various types of flight parameters 235 and the network parameters 230. For example, one or more models may be configured to receive the altitude of the UAV 200, the number of nearby base stations, the density of the nearby base stations, and the orientation of the UAV 200. Other models may be configured to receive the height of the base station with which the UAV 200 is communicating, the direction from the UAV 200 to that base station, the distance from the UAV 200 to that base station, and the orientation of the UAV 200. The models may be configured to output power levels for the communication interface 205 to use when communicating with the wireless carrier network.

The communication manager 255 may be configured to select the communication model based on the data included in the flight parameters 235 and the network parameters 230. For example, if the network parameters 230 do not include the base station density, then the communication manager 255 may not select from the models that are configured to receive the base station density. As another example, if the flight parameters 235 do not include the speed of the UAV 200, then the communication manager 255 may not select from the models that are configured to receive speed data.

The communication models 250 may be trained using historical data that includes data samples collected from the UAV 200, the wireless carrier network, other UAVs, and/or other subscriber devices. The communication models 250 may be trained using machine leaning and the historical data. The data samples may include data similar to the network parameters 230, the flight parameters 235, and/or the communication parameters 225. The data samples may also include data related to the quality of the connection between the UAV 200 or other devices and the wireless carrier network. This data may include a bandwidth of the connection, a latency of the connection, and/or any similar parameters that reflect the quality of the connection.

In some implementations, the UAV 200 may train the models. In some implementations, another device such as a device included with the wireless carrier network may train the models. The model trainer may train several models based on the various data samples. The model trainer may group the data samples based on the data included in the data samples. For example, data samples that include altitude data, bandwidth data, transmission power data, and base station density data may be grouped together. The resulting model may be configured to receive altitude data, transmission power data, and base station density data and to output an adjustment to the transmission power. Other models trained with different data samples may be configured to receive data similar to the data samples used to train each model.

Based on the communication manager 255 applying the network parameters 230 and the flight parameters 235 to the communication rules 240 and/or the communication models 250, the communication manager 255 determines a transmission power level for the UAV 200 or an adjustment to the transmission power level for the UAV 200. The communication manager 255 updates the transmission power level in the communication parameters 225, and the communication interface 205 transitions to communicating with the wireless carrier network according to the updated communication parameters 225.

In some implementations, the communications manager 255 may determine the bandwidth, latency, throughput, and/or another similar parameter that reflects the quality of the connection between the UAV 200 and the wireless carrier network after updating the communication parameters 225. The model trainer may use this network quality data along with the network parameters 230 and/or the flight parameters 235 to retrain the model. By retraining the model, the ability of the model to determine communication parameters that improve the ability of the UAV to communicate with the wireless carrier network while reducing interference with nearby devices improves.

Figure 3:
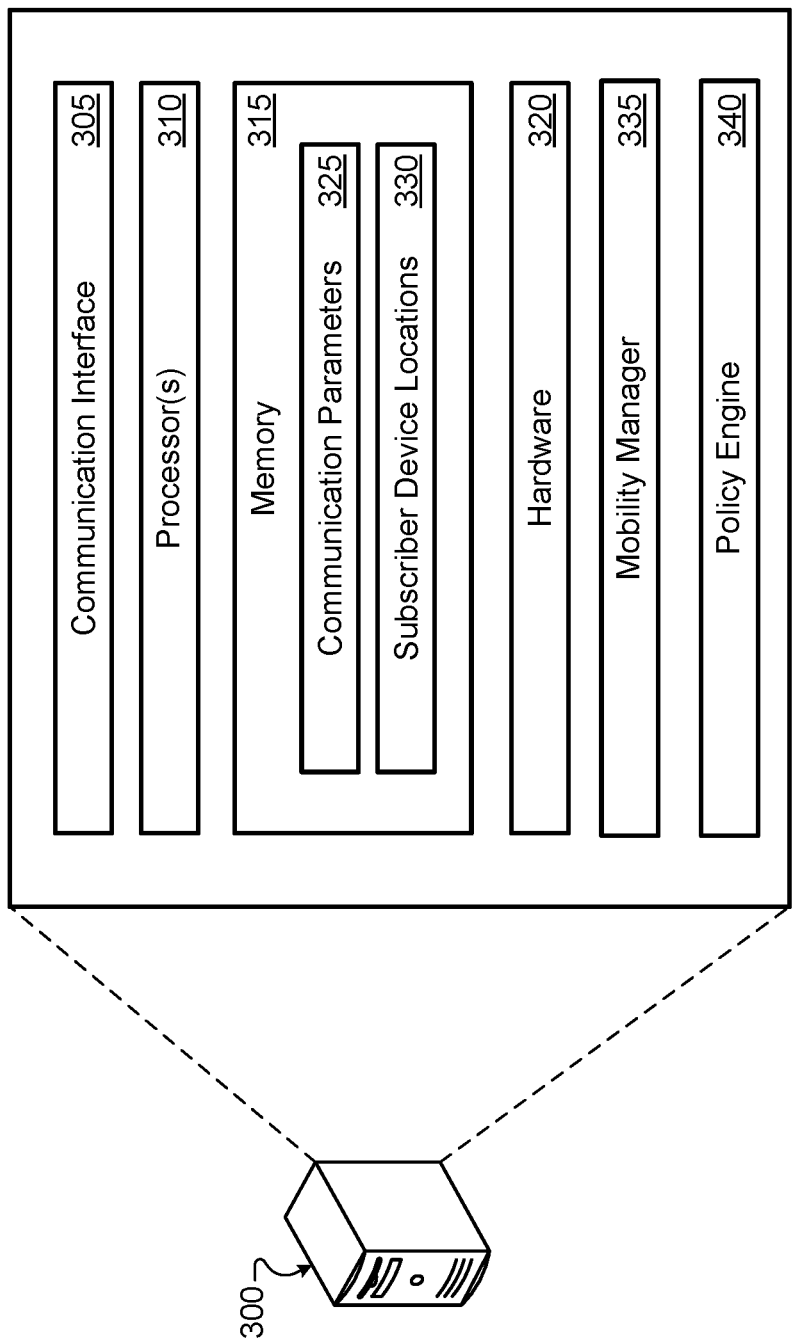
FIG. 3 illustrates an example server of a wireless carrier network.

FIG. 3 illustrates an example network server 300. The network server 300 may be any type of computing device that is configured to interface with a base station of a wireless carrier network. For example, the network server 300 may be similar to the network server 106. The components of the network server 300 may be implemented in a single computing device or distributed over multiple computing devices. The components may be in the form of virtual machines or software containers that are hosted in a cloud in communication with disaggregated storage devices.

The network server 300 may include a communication interface 305, one or more processors 310, memory 315, and hardware 320. The communication interface 305 may include wireless and/or wired communication components that enable the network server 300 to communicate with one or more base stations and/or other components of the wireless carrier network. The hardware 320 may include additional user interface, data communication, or data storage hardware. For example, the user interfaces may include a data output device (e.g., visual display, audio speakers), and one or more data input devices. The data input devices may include, but are not limited to, combinations of one or more of keypads, keyboards, mouse devices, touch screens that accept gestures, microphones, voice or speech recognition devices, and any other suitable devices.

The memory 315 may be implemented using computer-readable media, such as computer storage media. Computer-readable media includes, at least, two types of computer-readable media, namely computer storage media and communications media. Computer storage media includes volatile and non-volatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile disks (DVD), high-definition multimedia/data storage disks, or other optical storage, magnetic cassettes, magnetic tape, magnetic disk storage or other magnetic storage devices, or any other non-transmission medium that can be used to store information for access by a computing device. In contrast, communication media may embody computer-readable instructions, data structures, program modules, or other data in a modulated data signal, such as a carrier wave, or other transmission mechanism.

The one or more processors 310 may implement a mobility manager 335. The mobility manager 335 may be similar to the mobility manager 134 of FIG. 1. The mobility manager 335 may be configured to monitor the location of a subscriber device that is connected to the network server through a wireless base station such as a gNodeB. The location of the subscriber device may include the wireless base station to which the subscriber device is connected and/or GPS data received from the subscriber device. The mobility manager 335 may store the location data in the subscriber device locations 330 that is implemented by the memory 315.

In some implementations, the mobility manager 335 may determine the location of the subscriber device relative to the base station with which the subscriber device is communicating. In this case, the mobility manager 335 may determine the relative location based on data collected from the base station such as signal strength and direction of communications between the subscriber device and the base station. The mobility manager 335 may also determine the relative location based on the location of the base station and GPS data received from the subscriber device. The relative location data may include a distance between the subscriber device and the base station, the cardinal direction from the base station to the subscriber device, the altitude of the subscriber device, and/or any other similar measurements.

The memory 315 may include communication parameters 325. The communication interface 305 may access the communication parameters 325 to determine how to instruct the base station to communicate with each subscriber device. The communication parameters 325 may include a power level for the base station and any other similar parameters. For example, the communication parameters 325 may specify that the base station communicate with a particular subscriber device using thirty-five decibel-milliwatts of power. The communication parameters 325 may include a transmission power level for each subscriber device. In some implementations, the communication parameters 325 may also indicate a direction that the base station should direct communications with the subscriber device.

The one or more processors 310 may implement a policy engine 340. The policy engine 340 may be similar to the policy engine 140 of FIG. 1. The policy engine 340 may be configured to determine a transmission power level for the subscriber devices that are communicating with any of the base stations of the wireless carrier network. The policy engine 340 may determine a transmission power level that enables each subscriber device to have a reliable connection with the wireless carrier network while also ensuring that each subscriber device does not interfere with other nearby subscriber devices.

The policy engine 340 may have access to network parameters and/or flight parameters of the subscriber devices to determine a transmission power level for each subscriber device. In this case, the subscriber devices may transmit the network parameters and/or the flight parameters to the network server 300 through a base station. The policy engine 340 may provide instructions to the subscriber device to communicate with the base station using a specific transmission power level. In some implementations, the subscriber device may use the transmission power level specified by the policy engine 340 to override the transmission power level determined by the subscriber device. In some implementations, the subscriber device may disregard the instructions from the policy engine 340. In some implementations, the subscriber device may combine the transmission power level specified by the policy engine 340 with the transmission power level determined by the subscriber device by averaging the two.

The policy engine 340 may determine the transmission power level for each subscriber device in a similar fashion to the communication manager of the subscriber device. The policy engine 340 may use communication rules and/or communication models to determine the transmission power level for each subscriber device. In some implementations, the policy engine 340 may receive data from various subscriber devices that includes data similar to the network parameters and/or the flight parameters and also data that indicates the transmission power level that each subscriber device is using to communicate with the wireless carrier network. The policy engine 340 may also receive data that indicates a power level of the signal received by each subscriber device from the wireless carrier network. The policy engine 340 may also receive data that indicates a quality or reliability of the connection between each subscriber device and the wireless carrier network. This reliability data may include data related to bandwidth, latency, and/or any other similar parameter. The policy engine 340 may apply any portion of this data to the communication rules and/or communication models to determine the transmission power level for each subscriber device.

In some implementations, the network server 300 may include a model trainer that is configured to train the communication models using historical data and machine learning. The historical data includes data samples that includes network parameters, flight parameters, network reliability data, transmission power level data of the subscriber devices, reception power level data of the subscriber devices, transmission power level data of the base station, and/and reception power level data of the base station. In some implementations, each data sample may include data for the same subscriber device communicating with a base station. The historical data may include multiple data samples for different subscriber devices and different base stations. In some implementations, each data sample may include data collected from various subscriber devices communicating with the same base station. The model trainer may group the data samples into groups that include similar data. For example, a group of data samples may include attitude data, bandwidth data, transmission power level data and reception power level data of two different subscriber devices, and base station density. The model trainer may train the model to receive altitude data, base station density, transmission power level data of a first subscriber device and a second subscriber device, reception power level data of the first subscriber device and the second subscriber device, and an indication to adjust the transmission power level of the first subscriber device. The model may output data indicating a change to the transmission power level of the first subscriber device.

In some implementations, the model trainer may be configured to update each of the models by collecting additional data samples. The model trainer may receive these data samples after outputting data indicating how to change the transmission power level of various subscriber devices and after the subscriber devices have implemented that change. The model trainer may use machine learning and the additional data samples to retrain the model. The policy engine 340 may use the updated model and the network server 300 may provide the updated model to the subscriber devices.

Figure 4:
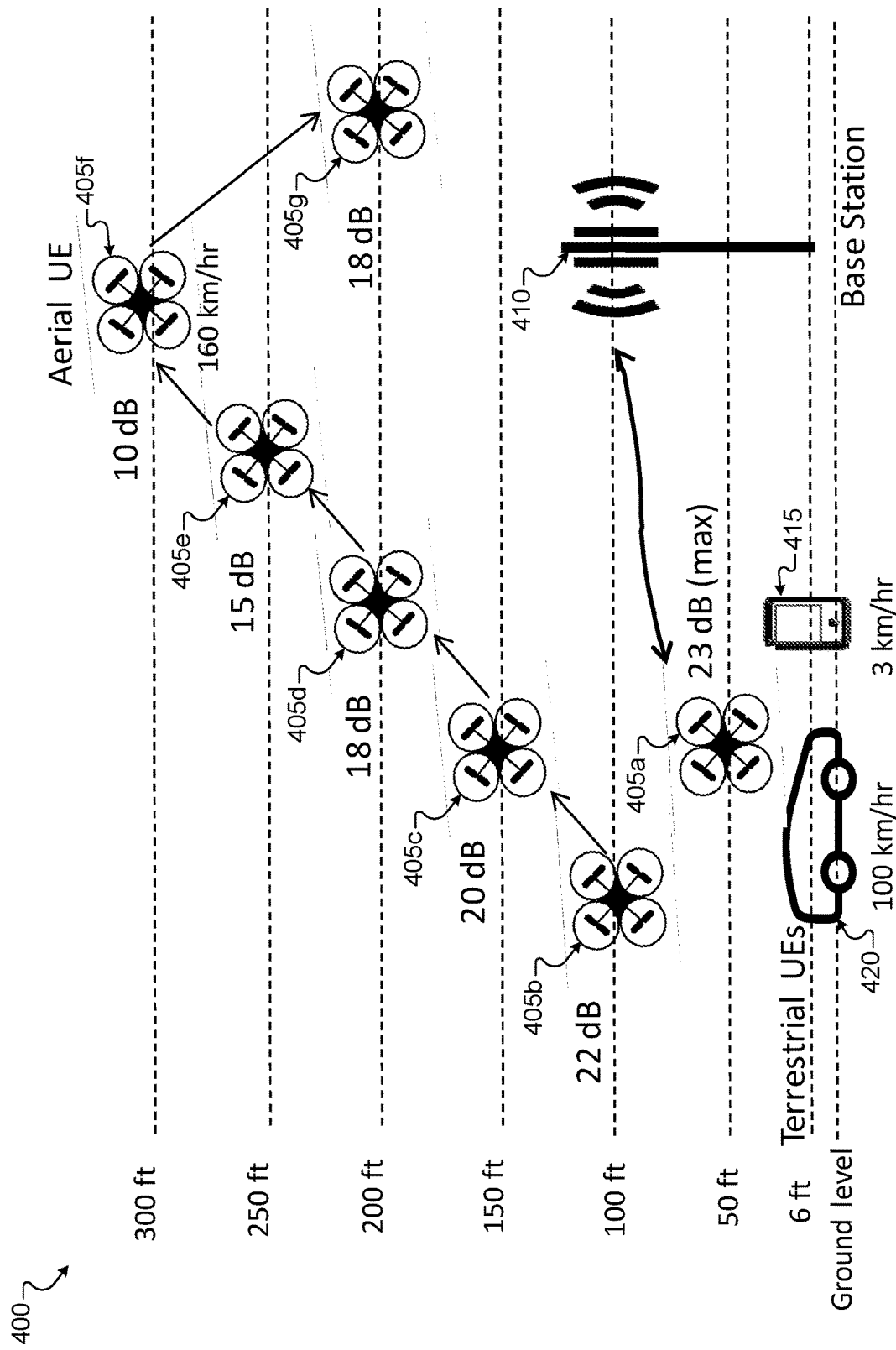
FIG. 4 illustrates a chart of an example UAV adjusting its transmission power as the altitude of the UAV changes.

FIG. 4 illustrates a chart 400 of an example UAV 405 adjusting its transmission power as the altitude of the UAV 405 changes. The UAV 405 may be similar to the UAV 102 of FIG. 1 and/or the UAV 200 of FIG. 2. The UAV 405 may be communicating with the base station 410 of a wireless carrier network. The base station 410 may be similar to the base station 104 of FIG. 1 and may be communicating with a network server similar to the network server 106 of FIG. 1 and/or the network server 300 of FIG. 3. The reference numbers 405*a-g* may represent the same UAV 405 at various points in time and while the UAV 405 is located at various altitudes.

The chart 400 illustrates three subscriber devices that are communicating with the same base station 410 of the wireless carrier network. The vehicle 420 may be moving along the ground at one hundred kilometers per hour and may include a cellular device that is configured to communicate with the wireless carrier network. A person may be walking with the mobile phone 415 at three kilometers per hour while the mobile phone 415 is communicating with the base station 410. In the same vicinity as the mobile phone 415 and the vehicle 420, the UAV 405 is navigating the air space and communicating with the base station 410. The speed of the UAV 405 may be one hundred sixty kilometers per hour and may vary. In some instances, the UAV 405 may be hovering in the air.

With the vehicle 420 and the mobile phone 415 moving along the ground, the vehicle 420 and the mobile phone 415 may communicate with the base station 410 by providing different levels of power to their respective antennas. This amount of power may vary as the distance between the base station 410 and the vehicle 420 or the mobile phone 415 changes. In some instances, the amount of power may vary based the speed of the device and/or other factors. In the example of FIG. 4, the vehicle 420 and the mobile phone 415 may use a transmission power level of twenty-three decibel-milliwatts.

The UAV 405*a* may be traveling at an altitude of fifty feet. The UAV 405*a* may be configured to adjust the transmission power level of the UAV 405*a* based on the altitude of the UAV 405*a*. If the UAV 405*a* is below a certain threshold altitude, then the UAV 405*a* may use a transmission power level of a subscriber device that is located on the ground. For example, if the altitude of the UAV 405*a* is below one hundred feet, then the UAV 405*a* may use a transmission power level similar to vehicle 420 and/or mobile phone 415, which may be twenty-three decibel-milliwatts. As another example, if the altitude of the UAV 405*a* is below the height of the base station or an antenna on the base station, then the UAV 405*a* may use a transmission power level similar to vehicle 420 and/or mobile phone 415, which may be twenty-three decibel-milliwatts. As another example, if the altitude of the UAV 405*a* is below a height where the UAV 405*a* is able to communicate with a similar number of base stations or antennas as the vehicle 420 and/or mobile phone 415, then the UAV 405*a* may use a transmission power level similar to vehicle 420 and/or mobile phone 415, which may be twenty-three decibel-milliwatts.

As the UAV 405 gains altitude, the UAV 405 may adjust the transmission power level based on the altitude of the UAV 405. The UAV 405 may compare the current altitude of the UAV 405 to a series of ranges. Based on the range in which the altitude is located, the UAV 405 may adjust the transmission power level. For example, the UAV 405b has an altitude of one hundred feet, which is between one hundred and one hundred forty-nine feet. That range may correspond to twenty-two decibel-milliwatts. The UAV 405c has an altitude of one hundred fifty feet, which is between one hundred fifty and one hundred ninety-nine feet. That range may correspond to twenty decibel-milliwatts. The UAV 405d has an altitude of two hundred feet, which is between two hundred and two hundred forty-nine feet. That range may correspond to eighteen decibel-milliwatts. The UAV 405e has an altitude of two hundred fifty feet, which is between two hundred fifty and two hundred ninety-nine feet. That range may correspond to fifteen decibel-milliwatts. The UAV 405f has an altitude of three hundred feet, which is at least three hundred feet or above. That range may correspond to ten decibel-milliwatts.

The UAV 405 may also decrease its altitude at various times. When the UAV 405 decreases its altitude, the UAV 405 may increase the transmission power level based on the range in which the altitude is located. For example, the UAV 405g has an altitude of two hundred feet, which is between two hundred and two hundred forty-nine feet. That range may correspond to eighteen decibel-milliwatts.

Figure 5:
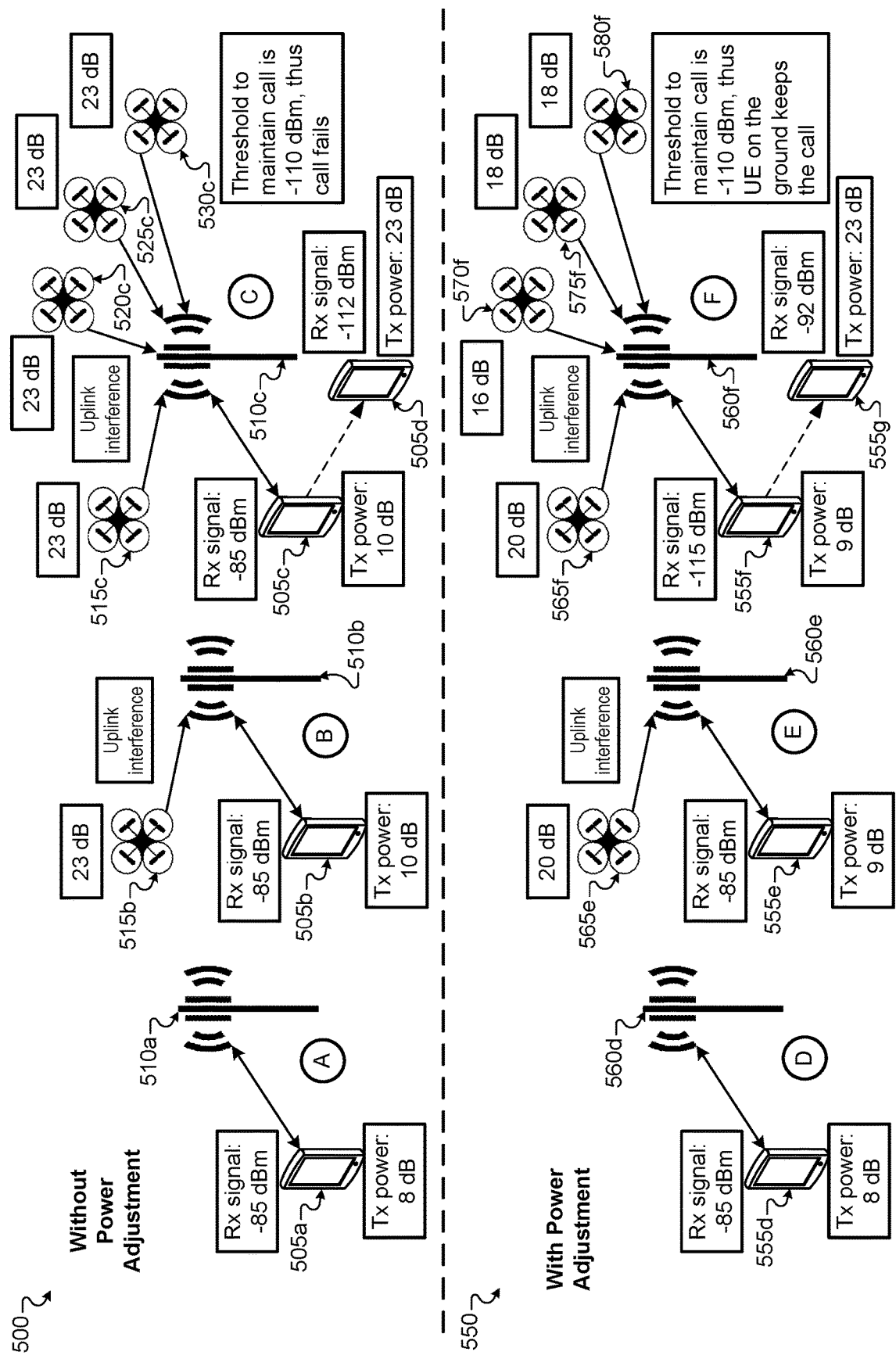
FIG. 5 illustrates example UAVs causing interference with a wireless carrier network.

FIG. 5 illustrates example UAVs causing interference with a wireless carrier network. Scenario 500 includes stages A, B, and C illustrating a subscriber device 505 communicating with a base station 510 of a wireless carrier network while UAVs 515, 520, 525, and 530 and other UAVs are communicating with the base station 510. Scenario 550 includes stages D, E, and F illustrating a subscriber device 555 communicating with a base station 560 of a wireless carrier network while UAVs 565, 570, 575, and 580 are communicating with the base station 560. The UAVs 515, 520, 525, 530, 565, 570, 575, and 580 may be similar to the UAV 102 of FIG. 1, the UAV 200 of FIG. 2, and/or the UAV 405 of FIG. 4. The base stations 510 and 560 may be similar to the base station 104 of FIG. 1 and/or the base station 410 of FIG. 4. The base stations 510 and 560 may be communicating with a network server similar to the network server 106 of FIG. 1 and/or the network server 300 of FIG. 3. The reference numbers that include letters may represent the same device or equipment at various points in time and/or location.

The subscriber device 505 may be any type of computing device that is configured to communicate with a wireless carrier network. For example, the subscriber device 505 may be a mobile phone, a tablet, a laptop, smart watch, or any other similar type of device. The subscriber device 505 may be a device that typically is used while the operator is on the ground or near the ground. The subscriber device 505 may include a communication interface that communicates with the base station 510 by providing different amounts of power to the antenna. In some instances, the subscriber device 505 may provide more power to the antenna if the signal detected from the base station 510 decreases. Similarly, the subscriber device 505 may provide less power to the antenna if the signal detected from the base station 510 increases. It may be beneficial for the subscriber device 505 to use less power to communicate with the base station 510 while still maintaining a reliable connection in order to conserve battery power.

In scenario 500 and in stage A, the subscriber device 505a is communicating with the base station 510a. The subscriber device 505a may detect a signal from the base station 510a that has a power level of −85 dBm. The subscriber device 505a may be communicating with the base station 510a and providing power to the antenna to generate an eight decibel-milliwatt signal. If the threshold to maintain a call is detecting at least a −110 dBm signal from the base station 510a, then the subscriber device 505a is able to maintain a call.

In stage B, the subscriber device 505b is communicating with the base station 510b. The UAV 515b is in the vicinity of the subscriber device 505b and is also communicating with the base station 510b. The UAV 515b may be communicating with the base station 510b and providing power to the antenna to generate a twenty-three decibel-milliwatt signal. With the twenty-three decibel-milliwatt decibel signal in the vicinity of the subscriber device 505b, the subscriber device 505b may generate a ten decibel-milliwatt decibel signal to maintain communication with the base station 510b. The subscriber device 505b may detect a signal from the base station 510b that has a power level of −85 dBm. At that power level, the subscriber device 505b is still able to maintain a call.

In stage C, the subscriber device 505c is communicating with the base station 510c. The UAV 515c is in the vicinity of the subscriber device 505c and is also communicating with the base station 510c. Initially, the UAV 515c may be the only other UAV in the vicinity communicating with the base station 510c. In this case, the UAV 515c may be providing power to the antenna to generate a twenty-three decibel-milliwatt signal. With the twenty-three decibel-milliwatt signal in the vicinity of the subscriber device 505c, the subscriber device 505c may generate a ten decibel-milliwatt signal to maintain communication with the base station 510c. The subscriber device 505c may detect a signal from the base station 510c that has a power level of −85 dBm.

In addition to the UAV 515c, UAV 520c, UAV 525c, and UAV 530c are also communicating with the base station 510c. Each of the UAV 520c, UAV 525c, and UAV 530c may be providing power to their respective antennas to generate a twenty-three decibel-milliwatt signals. With four twenty-three decibel-milliwatt signals in the vicinity of the subscriber device 505c, the subscriber device 505c may generate a twenty-three decibel-milliwatt signal to attempt to maintain communication with the base station 510c. In this case, however, the interference caused by the four twenty-three decibel-milliwatt signals from the UAV 515c, UAV 520c, UAV 525c, and UAV 530c cause the subscriber device 505c to detect a signal from the base station 510c that has a power level of −112 dBm. At that power level, the subscriber device 505c is unable to maintain a call. Because the UAV 515c, UAV 520c, UAV 525c, and UAV 530c are using full power or nearly full power to communicate with the base station 510c, the subscriber device 505c experiences interference that prevents the subscriber device 505c from maintaining a reliable connection with the base station 510c.

In scenario 550 and in stage D, the subscriber device 555d is communicating with the base station 560d. The subscriber device 555d may detect a signal from the base station 510a that has a power level of −85 dBm. The subscriber device 555d may be communicating with the base station 560d and providing power to the antenna to generate an eight decibel-milliwatt signal. If the threshold to maintain a call is detecting at least a −110 dBm signal from the base station 560d, then the subscriber device 555d is able to maintain a call.

In stage E, the subscriber device 555e is communicating with the base station 560e. The UAV 565e is in the vicinity of the subscriber device 555e and is also communicating with the base station 560e. The UAV 565e may be communicating with the base station 560e and providing power to the antenna to generate a twenty-three decibel-milliwatt signal. With the twenty-three decibel-milliwatt signal in the vicinity of the subscriber device 555e, the subscriber device 555e may generate a nine decibel-milliwatt signal to maintain communication with the base station 560e. The subscriber device 555e may detect a signal from the base station 560e that has a power level of −85 dBm. At that power level, the subscriber device 555e is still able to maintain a call.

In stage F, the subscriber device 555f is communicating with the base station 560f. The UAV 565f, UAV 570f, UAV 585f, and UAV 580f are in the vicinity of the subscriber device 555f and are also communicating with the base station 560f. Initially, the UAV 565f, UAV 570f, UAV 585f, and UAV 580f may be communicating with the base station 560f and may be providing power to their respective antennas to generate a twenty-three decibel signals. The subscriber device 555f may generate a nine decibel signal to communicate with the base station 560f. In this case, the interference caused by the four twenty-three decibel signals from the UAV 565f, UAV 570f, UAV 585f, and UAV 580f may cause the subscriber device 555f to detect a signal from the base station 560f that has a power level of −115 dBm. At that power level, the subscriber device 555f is unable to maintain a call.

However, in stage F, each of the UAV 565f, UAV 570f, UAV 585f, and UAV 580f are configured to adjust the power provided to their respective antennas. Because the UAV 565f, UAV 570f, UAV 585f, and UAV 580f are in the air, each one is able to maintain a reliable connection with the base station 560f even while reducing the power provided to their respective antennas. UAV 565f decreases the power level to twenty decibel-milliwatt. UAV 570f decreases the power level to sixteen decibel-milliwatt. UAV 575f decreases the power level to eighteen decibel-milliwatt. UAV 580f decreases the power level to eighteen decibel-milliwatt. The power level selected by each UAV may vary based on a number of factors. With four lower power signals in the vicinity of the subscriber device 555g, the subscriber device 555g may detect a signal from the base station 560f that has a power level of −92 dBm. The subscriber device 555g may provide power to its antenna to generate a twenty-three decibel-milliwatt signal. Because the detected signal is more powerful than the threshold of −110 dBm signal from the base station 560d, the subscriber device 555f is able to maintain a call even in the presence of four UAVs.

FIG. 6 is a flowchart of an example process 600 for adjusting the transmission power of a UAV. In general, the process 600 determines the altitude of the UAV and a distance between the UAV and a base station. Based on the altitude and the distance, the process 600 may adjust the power level of a transceiver included in the UAV. The process 600 will be described as being performed by the UAV 102 of FIG. 1 and will include references to other components in FIG. 1. The process 600 may also be performed by the UAV 200 of FIG. 2, the UAV 405 of FIG. 4, and/or the UAVs 565, 570, 575, and 580 of FIG. 5.

The UAV 102 includes a radio transceiver and determines an altitude of the UAV 102 and a distance between the UAV 102 and a base station 104 (610). The UAV 102 may include a flight manager that measures various flight parameters of the UAV 102. The altitude of the UAV 102 may be one of those flight parameters. The UAV 102 may also determine a distance between the UAV 102 and the base station 104. In some instances, the distance may be a distance as projected on the ground, which may not account for differences between the altitude of the UAV 102 and the height of the base station 104. In some instances, the distance may be a distance directly from the base station 104 and the UAV 102, which may be longer than the distance projected on the ground.

In some implementations, the UAV 102 may determine the speed of the UAV 102. For example, the UAV 102 may be traveling at five miles per hour. In some implementations, the UAV 102 may determine the height of the base station 104. The UAV 102 may calculate the height of the base station 104 based on the timing of signals received from the base station 104. Additionally, or alternatively, the base station 104 may provide data to the UAV 102 indicating the height of the base station 104.

In some implementations, the UAV 102 may determine a density of the base stations in the vicinity of the UAV 102. The density of the base stations may reflect a number of base stations per unit area. The UAV 102 may determine the density while navigating the air, and/or the UAV 102 may receive data indicating the density from the base station 104.

In some implementations, the UAV 102 may determine the number of base stations with which the UAV 102 is able to communicate. In this case, the UAV 102 may receive signals from nearby base stations. Some of those signals may satisfy a threshold power level. Those signals that satisfy the threshold power level may correspond to base stations with which the UAV 102 is able to communicate.

In some implementations, the UAV 102 may determine a number of base stations with which the UAV 102 has communicated while navigating the air. The UAV may compare the number of base stations to the distance traveled, which may be the distance from the original location to the current location or a straight-line distance from the original location to the current location. The UAV 102 may determine the number of base stations with which the UAV 102 has communicated for a particular time period, such as the previous five minutes.

In some implementations, the UAV 102 may determine a power level at which the base station 104 is using to communicate with the UAV 102. The UAV 102 may also determine a power level at which another nearby base station is using to communicate with the UAV 102. The UAV 102 may determine these power levels based on data received from the base stations and/or based on the detected signals and the locations of the base stations.

In some implementations, the UAV 102 may determine a distance between the UAV 102 and another device that is communicating with the base station 104. The UAV 102 may determine the distance using various sensors included in the UAV 102, such as a camera, short range radio transceivers, and/or any other location sensors. The UAV 102 may determine the distance based on data received from the base station 104. For example, the base station 104 may provide data indicating a location of the other device that is communicating with the base station 104.

Based on the altitude of the UAV 102 and the distance between the UAV 102 and the base station 104, the UAV 102 determines a transmission power level for the radio transceiver (620). The UAV 102 may use one or more communication rules and/or one or more communication models to determine the transmission power level for the radio transceiver. The communication rules may relate various altitudes and/or distances to a transmission power level. The communication models may be configured to receive altitude data and distance data and output data indicating the transmission power level.

In some implementations, the UAV 102 may use the additional factors noted above to determine the transmission power level. The additional factors may include the speed of the UAV 102, the height of the base station 104, the density of the nearby base stations, the number of base stations with which the UAV 102 is able to communicate, the number of base stations with which the UAV 102 has communicated over a period of time, the transmission power level of the base station 104 and another base station, a distance between the UAV 102 and another device communicating with the base station 104, and/or any similar factors.

The UAV 102 may apply these additional factors to the communication rules and/or the communication models to determine a transmission power level. The communication models may be trained using machine learning and historical data that includes data samples that includes similar data collected from other UAVs communicating with the base station 104 and other base stations.

The UAV 102 communicates with the base station 104 using the radio transceiver operating at the transmission power level (630). By adjusting the transmission power level, the UAV 102 reduces interferences with nearby devices that are communicating with the base station 104. If the transmission power level is at full power, the UAV 102 may also be able to communicate with too many base stations, which can cause unnecessary switching between base stations. By reducing the power level, the UAV 102 is able to communicate with fewer base stations, which may be the number with which a subscriber device on the ground is able to communicate. Adjusting the power level also prevents the nearby subscriber devices from unnecessarily increasing their transmission power levels in an attempt to overcome the interference caused by the UAV 102 operating at a higher transmission power level.

Figure 7:
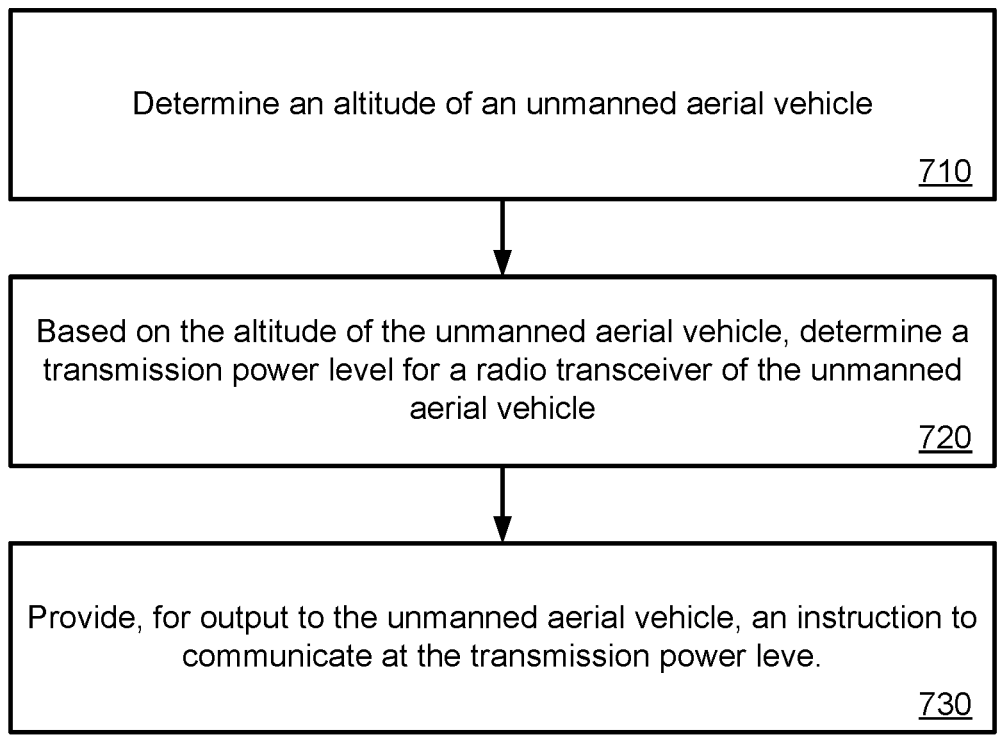

FIG. 7 is a flowchart of an example process 700 for adjusting the transmission power of a UAV. In general, the process 700 determines the altitude of the UAV. Based on the altitude of the UAV, the process 700 may determine an appropriate power level for a transceiver of the UAV. The process 700 will be described as being performed by the network server 106 of FIG. 1 and will include references to other components in FIG. 1. The process 700 may also be performed by the server 300 of FIG. 3.

The network server 106 determines the altitude of the UAV 102 (710). In some implementations, the network server 106 determines the altitude of the UAV 102 based on signals exchanged between the UAV 102 and the base station 104 and/or between the UAV 102 and other base stations. The network server 106 may determine the altitude based on analyzing the signal strength, origin, and/or directionality of the signals. In some implementations, the network server 106 may receive data from the UAV 102 indicating the altitude of the UAV 102.

In some implementations, the network server 106 may determine additional flight parameters of the UAV 102. The network server 106 may determine the flight parameters based on analyzing the characteristics of signals exchanged between the UAV 102 and the base station 104 and/or between the UAV 102 and other base stations. In some implementations, the network server 106 may receive data from the UAV 102 indicating the other flight parameters of the UAV 102.

In some implementations, the network server 106 may determine various network parameters of the wireless carrier network in the vicinity of the UAV 102. The network server 106 may determine the location of the UAV 102 and/or receive data from the UAV 102 indicating the location of the UAV 102. The network parameters may include a number of base stations that are within a threshold distance of the UAV 102, the density of the nearby base stations, the height of the base station 104, the height of other nearby base stations, the distance between the UAV 102 and the base station 104, distances between the UAV 102 and other nearby base stations, a direction from the UAV 102 to the base station 104, directions from the UAV 102 other nearby base station, and/or any other similar network parameters. In some implementations, the network parameters may also include the transmission power level that the base station 104 is using to communicate with the UAV 102.

Based on the altitude of the UAV 102, the network server 106 determines a transmission power level for a radio transceiver of the UAV 102 (720). In some implementations, the network server 106 determines the transmission power level based on the additional flight parameters and/or the network parameters. The network server 106 may apply the altitude, the additional flight parameters, and/or the network parameters to one or more models and/or rules to determine the transmission power level. The network server 106 may select a transmission power level to limit the interference that the UAV 102 causes with nearby UAVs and nearby devices communicating with the wireless carrier network.

The network server 106 provides, for output to the UAV 102, an instruction to communicate at the transmission power level (730). The network server 106 may continue to monitor the altitude, the additional flight parameters, and/or the network parameters of the UAV 102 and the wireless carrier network. If the network server 106 determines that the interference that the UAV 102 causes with nearby UAVs and nearby devices can be reduced, then the network server 106 may provide an additional instruction to the UAV 102 to adjust the transmission power level.

Although a few implementations have been described in detail above, other modifications are possible. In addition, the logic flows depicted in the figures do not require the particular order shown, or sequential order, to achieve desirable results. In addition, other actions may be provided, or actions may be eliminated, from the described flows, and other components may be added to, or removed from, the described systems. Accordingly, other implementations are within the scope of the following claims.

What is claimed is:

1. A computer-implemented method, comprising:
   determining, by an unmanned aerial vehicle that includes a radio transceiver, an altitude of the unmanned aerial vehicle and a distance between the unmanned aerial vehicle and a base station;
   based on the altitude of the unmanned aerial vehicle and the distance between the unmanned aerial vehicle and the base station, determining, by the unmanned aerial vehicle, a transmission power level for the radio transceiver that is configured to reduce a likelihood that the radio transceiver causes interference with additional radio transceivers on the ground and that is configured to reduce a likelihood that the radio transceiver is able to communicate with a higher number of base stations than an additional radio transceiver of a computer device on the ground; and
   communicating, by the unmanned aerial vehicle, with the base station using the radio transceiver operating at the transmission power level that is configured to reduce the likelihood that the radio transceiver causes interference with the additional radio transceivers on the ground and that is configured to reduce the likelihood that the radio transceiver is able to communicate with the higher number of base stations than the additional radio transceivers on the ground.

2. The method of claim 1, comprising:
determining, by the unmanned aerial vehicle, a speed of the unmanned aerial vehicle,
wherein determining the transmission power level for the radio transceiver that is configured to reduce the likelihood that the radio transceiver causes interference with the additional radio transceivers on the ground and that is configured to reduce the likelihood that the radio transceiver is able to communicate with the higher number of base stations than the additional radio transceivers on the ground is further based on the speed of the unmanned aerial vehicle.

3. The method of claim 1, comprising:
determining a height of the base station,
wherein determining the transmission power level for the radio transceiver that is configured to reduce the likelihood that the radio transceiver causes interference with the additional radio transceivers on the ground and that is configured to reduce the likelihood that the radio transceiver is able to communicate with the higher number of base stations than the additional radio transceivers on the ground is further based on the height of the base station.

4. The method of claim 1, comprising:
determining, by the unmanned aerial vehicle, a density of base stations in a vicinity of the unmanned aerial vehicle,
wherein determining the transmission power level for the radio transceiver that is configured to reduce the likelihood that the radio transceiver causes interference with the additional radio transceivers on the ground and that is configured to reduce the likelihood that the radio transceiver is able to communicate with the higher number of base stations than the additional radio transceivers on the ground is further based on the density of base stations in the vicinity of the unmanned aerial vehicle.

5. The method of claim 1, comprising:
determining, by the unmanned aerial vehicle, a number of base stations with which the radio transceiver is able to communicate; and
comparing the number of base stations to a threshold,
wherein determining the transmission power level for the radio transceiver that is configured to reduce the likelihood that the radio transceiver causes interference with the additional radio transceivers on the ground and that is configured to reduce the likelihood that the radio transceiver is able to communicate with the higher number of base stations than the additional radio transceivers on the ground is further based on comparing the number of base stations to the threshold.

6. The method of claim 1, comprising:
providing, for output to the base station, data indicating an altitude of the unmanned aerial vehicle,
wherein the base station is configured to adjust a transmission power level for the base station to communicate with the unmanned aerial vehicle based on the altitude of the unmanned aerial vehicle.

7. The method of claim 1, comprising:
determining, by the unmanned aerial vehicle, a number of base stations that the radio transceiver has communicated with during a period of time,
wherein determining the transmission power level for the radio transceiver that is configured to reduce the likelihood that the radio transceiver causes interference with the additional radio transceivers on the ground and that is configured to reduce the likelihood that the radio transceiver is able to communicate with the higher number of base stations than the additional radio transceivers on the ground is further based on the number of base stations that the radio transceiver has communicated with during the period of time.

8. The method of claim 1, comprising:
determining, by the unmanned aerial vehicle, a first transmission power level of the base station and a second transmission power level of an additional base station,
wherein determining the transmission power level for the radio transceiver that is configured to reduce the likelihood that the radio transceiver causes interference with the additional radio transceivers on the ground and that is configured to reduce the likelihood that the radio transceiver is able to communicate with the higher number of base stations than the additional radio transceivers on the ground is further based on the first transmission power level of the base station and a second transmission power level of the additional base station.

9. The method of claim 1, comprising:
determining, by the unmanned aerial vehicle, a distance between the unmanned aerial vehicle and another device communicating with the base station,
wherein determining the transmission power level for the radio transceiver that is configured to reduce the likelihood that the radio transceiver causes interference with the additional radio transceivers on the ground and that is configured to reduce the likelihood that the radio transceiver is able to communicate with the higher number of base stations than the additional radio transceivers on the ground is further based on the distance between the unmanned aerial vehicle and the other device communicating with the base station.

10. A system, comprising:
one or more processors; and
memory including a plurality of computer-executable components that are executable by the one or more processors to perform a plurality of actions, the plurality of actions comprising:
  determining, by an unmanned aerial vehicle that includes a radio transceiver, an altitude of the unmanned aerial vehicle and a distance between the unmanned aerial vehicle and a base station;
  based on the altitude of the unmanned aerial vehicle and the distance between the unmanned aerial vehicle and the base station, determining, by the unmanned aerial vehicle, a transmission power level for the radio transceiver that is configured to reduce a likelihood that the radio transceiver causes interference with additional radio transceivers on the ground and that is configured to reduce a likelihood that the radio transceiver is able to communicate with a higher number of base stations than an additional radio transceiver of a computer device on the ground; and
  communicating, by the unmanned aerial vehicle, with the base station using the radio transceiver operating at the transmission power level that is configured to reduce the likelihood that the radio transceiver causes interference with the additional radio transceivers on the ground and that is configured to reduce the likelihood that the radio transceiver is able to communicate with the higher number of base stations than the additional radio transceivers on the ground.

11. The system of claim 10, wherein the actions comprise:
determining, by the unmanned aerial vehicle, a speed of the unmanned aerial vehicle,
wherein determining the transmission power level for the radio transceiver that is configured to reduce the likelihood that the radio transceiver causes interference with the additional radio transceivers on the ground and that is configured to reduce the likelihood that the radio transceiver is able to communicate with the higher number of base stations than the additional radio transceivers on the ground is further based on the speed of the unmanned aerial vehicle.

12. The system of claim 10, wherein the actions comprise:
determining a height of the base station,
wherein determining the transmission power level for the radio transceiver that is configured to reduce the likelihood that the radio transceiver causes interference with the additional radio transceivers on the ground and that is configured to reduce the likelihood that the radio transceiver is able to communicate with the higher number of base stations than the additional radio transceivers on the ground is further based on the height of the base station.

13. The system of claim 10, wherein the actions comprise:
determining, by the unmanned aerial vehicle, a density of base stations in a vicinity of the unmanned aerial vehicle,
wherein determining the transmission power level for the radio transceiver that is configured to reduce the likelihood that the radio transceiver causes interference with the additional radio transceivers on the ground and that is configured to reduce the likelihood that the radio transceiver is able to communicate with the higher number of base stations than the additional radio transceivers on the ground is further based on the density of base stations in the vicinity of the unmanned aerial vehicle.

14. The system of claim 10, wherein the actions comprise:
determining, by the unmanned aerial vehicle, a number of base stations with which the radio transceiver is able to communicate; and
comparing the number of base stations to a threshold,
wherein determining the transmission power level for the radio transceiver that is configured to reduce the likelihood that the radio transceiver causes interference with the additional radio transceivers on the ground and that is configured to reduce the likelihood that the radio transceiver is able to communicate with the higher number of base stations than the additional radio transceivers on the ground is further based on comparing the number of base stations to the threshold.

15. The system of claim 10, wherein the actions comprise:
providing, for output to the base station, data indicating an altitude of the unmanned aerial vehicle,
wherein the base station is configured to adjust a transmission power level for the base station to communicate with the unmanned aerial vehicle based on the altitude of the unmanned aerial vehicle.

16. The system of claim 10, wherein the actions comprise:
determining, by the unmanned aerial vehicle, a number of base stations that the radio transceiver has communicated with during a period of time,
wherein determining the transmission power level for the radio transceiver that is configured to reduce the likelihood that the radio transceiver causes interference with the additional radio transceivers on the ground and that is configured to reduce the likelihood that the radio transceiver is able to communicate with the higher number of base stations than the additional radio transceivers on the ground is further based on the number of base stations that the radio transceiver has communicated with during the period of time.

17. The system of claim 10, wherein the actions comprise:
determining, by the unmanned aerial vehicle, a first transmission power level of the base station and a second transmission power level of an additional base station,
wherein determining the transmission power level for the radio transceiver that is configured to reduce the likelihood that the radio transceiver causes interference with the additional radio transceivers on the ground and that is configured to reduce the likelihood that the radio transceiver is able to communicate with the higher number of base stations than the additional radio transceivers on the ground is further based on the first transmission power level of the base station and a second transmission power level of the additional base station.

18. The system of claim 10, wherein the actions comprise:
determining, by the unmanned aerial vehicle, a distance between the unmanned aerial vehicle and another device communicating with the base station,
wherein determining the transmission power level for the radio transceiver that is configured to reduce the likelihood that the radio transceiver causes interference with the additional radio transceivers on the ground and that is configured to reduce the likelihood that the radio transceiver is able to communicate with the higher number of base stations than the additional radio transceivers on the ground is further based on the distance between the unmanned aerial vehicle and the other device communicating with the base station.

19. One or more non-transitory computer-readable media of a computing device storing computer-executable instructions that upon execution cause one or more processors to perform acts comprising:
determining, by an unmanned aerial vehicle that includes a radio transceiver, an altitude of the unmanned aerial vehicle and a distance between the unmanned aerial vehicle and a base station;
based on the altitude of the unmanned aerial vehicle and the distance between the unmanned aerial vehicle and the base station, determining, by the unmanned aerial vehicle, a transmission power level for the radio transceiver that is configured to reduce a likelihood that the radio transceiver causes interference with additional radio transceivers on the ground and that is configured to reduce a likelihood that the radio transceiver is able to communicate with a higher number of base stations than an additional radio transceiver of a computer device on the ground; and
communicating, by the unmanned aerial vehicle, with the base station using the radio transceiver operating at the transmission power level that is configured to reduce the likelihood that the radio transceiver causes interference with the additional radio transceivers on the ground and that is configured to reduce the likelihood that the radio transceiver is able to communicate with the higher number of base stations than the additional radio transceivers on the ground.

20. The non-transitory computer-readable media of claim 19, wherein the acts comprise:
determining, by the unmanned aerial vehicle, a speed of the unmanned aerial vehicle,
wherein determining the transmission power level for the radio transceiver that is configured to reduce the likelihood that the radio transceiver causes interference with the additional radio transceivers on the ground and that is configured to reduce the likelihood that the radio transceiver is able to communicate with the higher number of base stations than the additional radio transceivers on the ground is further based on the speed of the unmanned aerial vehicle.

* * * * *